United States Patent
Nies

(10) Patent No.: US 7,621,720 B2
(45) Date of Patent: Nov. 24, 2009

(54) COOLING DEVICE

(75) Inventor: Jacob Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 404 days.

(21) Appl. No.: 11/427,875

(22) Filed: Jun. 30, 2006

(65) Prior Publication Data

US 2008/0003105 A1  Jan. 3, 2008

(51) Int. Cl.
*F03D 1/06* (2006.01)
*F01D 25/12* (2006.01)

(52) U.S. Cl. .................. 416/1; 416/96 R; 415/115; 415/905; 415/908

(58) Field of Classification Search ............... 415/119, 415/905, 908; 416/95, 96 R
See application file for complete search history.

(56) References Cited

U.S. PATENT DOCUMENTS

| | | | | |
|---|---|---|---|---|
| 2,576,487 | A * | 11/1951 | Stanley | 244/134 C |
| 6,264,877 | B1 | 7/2001 | Pallu De La Barriere | |
| 6,400,039 | B1 * | 6/2002 | Wobben | 290/44 |
| 6,492,743 | B1 | 12/2002 | Appa | |
| 6,520,737 | B1 | 2/2003 | Fischer et al. | |
| 6,676,122 | B1 * | 1/2004 | Wobben | 415/119 |
| 7,051,548 | B2 | 5/2006 | Pruitt | |
| 7,111,668 | B2 * | 9/2006 | Rurup | 165/134.1 |
| 7,200,005 | B2 | 4/2007 | Von Gutfeld et al. | |

FOREIGN PATENT DOCUMENTS

| | | |
|---|---|---|
| DE | 10352023 A1 | 6/2005 |
| NL | 8103416 | 2/1983 |
| WO | 0106121 A1 | 1/2001 |
| WO | 0177526 A1 | 10/2001 |
| WO | 2006017888 A1 | 2/2006 |

OTHER PUBLICATIONS

European Search Report for application EP 07110882, dated Dec. 6, 2007.

* cited by examiner

*Primary Examiner*—Igor Kershteyn
(74) *Attorney, Agent, or Firm*—James McGinness, Esq.; Armstrong Teasdale LLP

(57) ABSTRACT

A cooling device for a wind turbine is provided, the cooling device including at lease one liquid-tight tube which is partially filled with a liquid coolant, wherein one end of the tube is located in a first area and another end of the tube is located in a second area, the first and second areas having different temperatures when operating the wind turbine.

18 Claims, 5 Drawing Sheets

COOLING DEVICE

BACKGROUND OF THE INVENTION

The present invention relates to cooling devices, especially cooling devices for wind turbines, and to a method for cooling at least selected parts of a wind turbine rotor hub.

Many installations inside the hub of a wind turbine rotor produce heat during operation. In particular, heat sources inside the hub are as diverse as relays installed in switch cabinets, batteries, chargers for batteries, pitch drive motors, pitch gear boxes, and pitch drive controllers, hydraulic units, as well as the main shaft bearing in some designs. However, reliable operation of several components is only guarantees within a certain temperature range. For example, electronic circuits or batteries may malfunction at excess temperatures. Due to the several heat sources inside the hub, overheating problems of these components may occur, especially during summer.

BRIEF DESCRIPTION OF THE INVENTION

In view of the above, a cooling device for a wind turbine is provided. The cooling device includes at least one liquid-tight tube which is partially filled with a liquid coolant, wherein one end of the tube is located in a first area and another end of the tube is located in a second area, the first and second areas having different temperatures when operating the wind turbine.

Furthermore, a heat exchanger for a wind turbine rotor hub is provided. The heat exchanger includes one or more conduits which are partly filled with a liquid and extend from a cool area to a relatively hotter area, the liquid being adapted to absorb and dissipate heat, wherein the liquid can be agitated within the one or more conduits by rotating the wind turbine rotor hub.

Also, a method for cooling at least one selected part inside a wind turbine rotor hub is provided. The method includes the steps of: (a) providing at least one duct being partially filled with a liquid coolant and extending between the at least one selected part and a reservoir having lower temperature than the at least one selected part, and (b) moving the liquid coolant between the at least one selected part and the reservoir having lower temperature.

Further aspects, advantages and features of the present invention are apparent from the dependent claims, the description and the accompanying drawings.

According to a first aspect of the invention, a heat transfer unit for a wind turbine is provided. The heat transfer unit includes at least one sealed cooling pipe holding a liquid cooling agent. The volume of the liquid cooling agent is smaller than the inner volume of the cooling pipe, wherein the cooling pipe extends between two reservoirs which are at different temperatures during operation of the wind turbine. Due to the rotation of the wind turbine hub, the liquid cooling agent is moved back and forth between opposite ends of the cooling pipe, thus transferring heat from the warmer to the cooler reservoir. Thus, cooling of hub installations can be effected with a passive cooling system. No moving parts or electrical energy are needed for the heat transfer unit.

According to a further aspect of the present invention, a method for refrigerating a specific area inside a wind turbine rotor hub is provided. The method includes a step of providing at least one pipe containing a liquid refrigerant, the amount of refrigerant being smaller than the interior volume of the pipe. The pipe connects the specific area inside the hub with an area being at a lower temperature than the specific area. In a further step of the method, the liquid refrigerant is agitated and flows back and forth between the specific area to be refrigerated and the cooler area.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
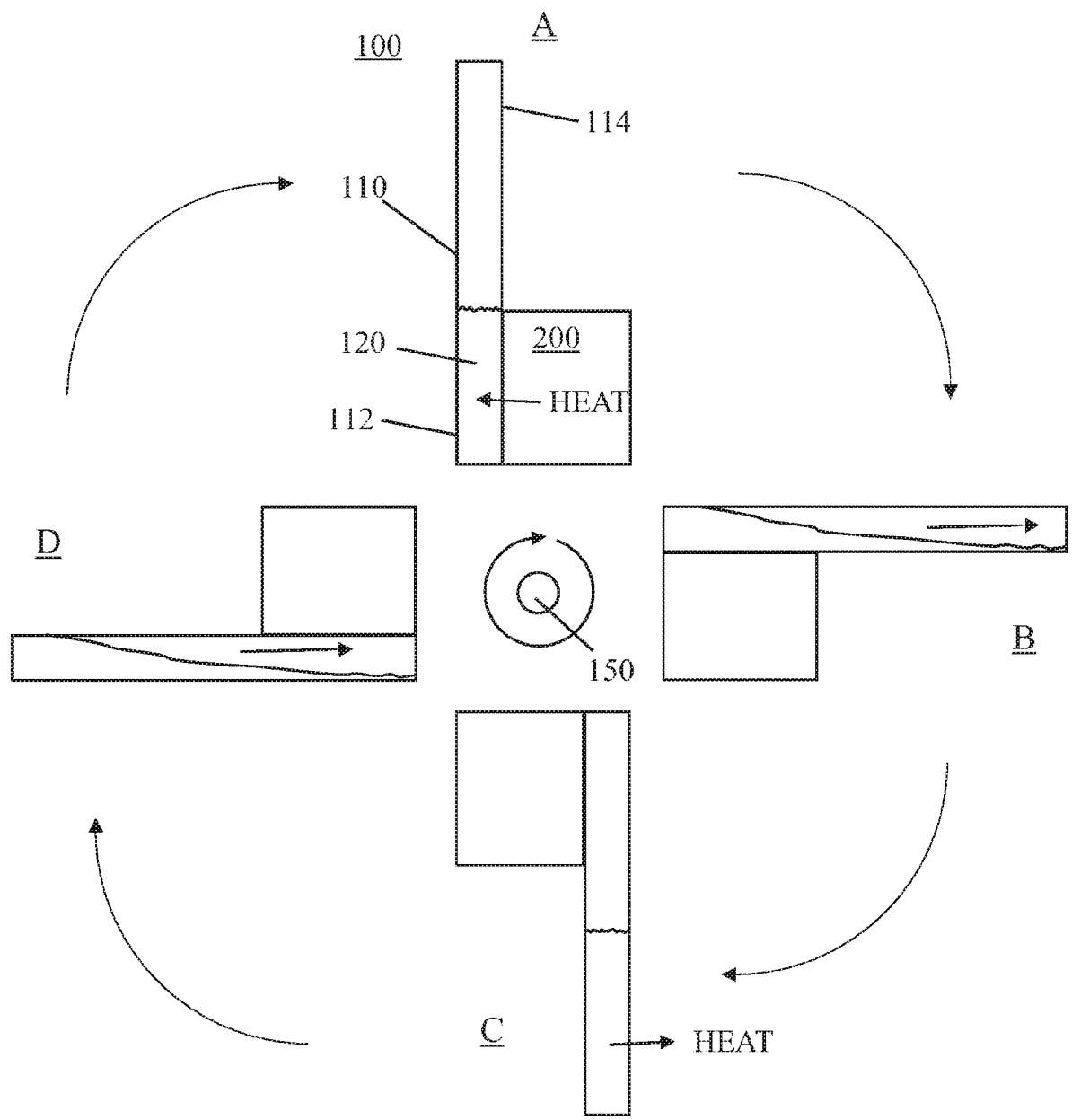
FIG. 1 is a schematic illustration of a cooling device according to an embodiment of the present invention.

FIG. 1 is a schematic illustration of a cooling device 100 according to an embodiment of the present invention. Therein, the cooling device 100 includes a tube 110 which is partially filled with a liquid coolant 120. The tube 100 is of a liquid-tight type so that the liquid coolant 120 is safely contained therein. Typically, the liquid coolant has a relatively low viscosity and may be selected from the group consisting of water, an alcohol, methanol, ethanol, glycol, or any mixture thereof. Furthermore, also other liquid coolants used in the field of air-conditioning may be used as liquid coolant 120 for the purpose of the present invention.

The tube 110 has two opposing ends 112, 114 which are located in areas of different temperature. In particular, a first end 112 is located in a first area and a second end 114 is located in a second area, e.g. at the outside wall of a wind turbine rotor hub. Within the first area, a device 200 to be cooled is installed around in contact with or adjacent the heat absorbing end 112 of tube 110 so that heat transfer between the device 200 and the liquid coolant 120 inside tube 110 is enabled. Accordingly, the wall of tube 110 is typically made of material having excellent heat conducting properties. In other words, the cooling device according to an embodiment of the present invention is adapted to transfer heat from a warm reservoir being at a relatively higher temperature to a cooler reservoir being at a relatively lower temperature. In this context, the term "reservoir" is used in a thermodynamical way and should not be restricted to liquid reservoirs or the like. Especially, the structural parts of the wind turbine rotor as well as the rotor cover may serve as a reservoir. Furthermore, also the air inside the rotor hub or inside the rotor blades may serve as a reservoir. Finally, it should also be understood that these parts may also serve not only as reservoirs but also as heat dissipating elements dissipating the absorbed heat, e.g. to the ambient air.

For example, the device 200 to be cooled may be a switch cabinet, a battery, a charger, a controller, an electric motor, a gear box, a hydraulic unit or any other device that may produce heat during operation. In particular, it is intended that the device 200 is a device which is installed inside a rotor hub of a wind turbine.

Next, the operation of the cooling device 100 is described with reference to FIG. 1. The cooling device 100 is installed within or on a rotatable means, e.g. inside a wind turbine rotor hub. As shown in FIG. 1, the cooling device 100 as well as the device 200 to be cooled are typically located off-axis the rotational axis 150. However, the cooling device will be typically installed close to the center of rotation to reduce the centrifugal force acting on the liquid coolant. Due to the rotational movement of the support, the cooling device will take the positions A, B, C, and D during one cycle of rotation. In upright position A, the liquid coolant 120 is pulled into the lower part of tube 110 by gravitational force. Therefore, the coolant is located within the warmer area 112 next to the device 200. In this position, heat will be transferred from the device 200 to the liquid coolant 120. Next, the cooling device rotates clockwise to intermediate position B. It is shown in FIG. 1 that the liquid coolant 120 flows toward the cooler end 114 of tube 110. This flow of liquid coolant 120 is induced to the combined action of centrifugal and gravitational force. Then, in position C the liquid coolant 120 has collected at the cooler end 114 of tube 110 and heat is dissipated from liquid coolant 120 to the cooler reservoir 114. Next, the cooling device 100 attains a further intermediate position D in which the liquid coolant 120 flows back towards the warmer reservoir end 112. Finally, the cooling device 100 is rotated back toward upright position A and the cooling cycle repeats.

A cooling device 100 according to an embodiment of the present invention can effectively cool components located within or onto a rotating support. The cooling device 100 does not require moving parts or external power supply. Thus, the cooling device 100 is a passive system and, therefore, wear-resistant and almost maintenance-free. Furthermore, when using a liquid coolant having a freezing point near 0° C., e.g. water or an aqueous solution of an alcohol, the liquid coolant will freeze in winter and, thus stop the heat exchange in a natural way. In this case, the tube 110 is designed to withstand freezing, e.g. by selecting a suitable cross-sectional shape of the tube and/or a suitable wall material for the tube. For example, the tube may have an oval cross-section and/or may be made of an expandable material.

Figure 2:
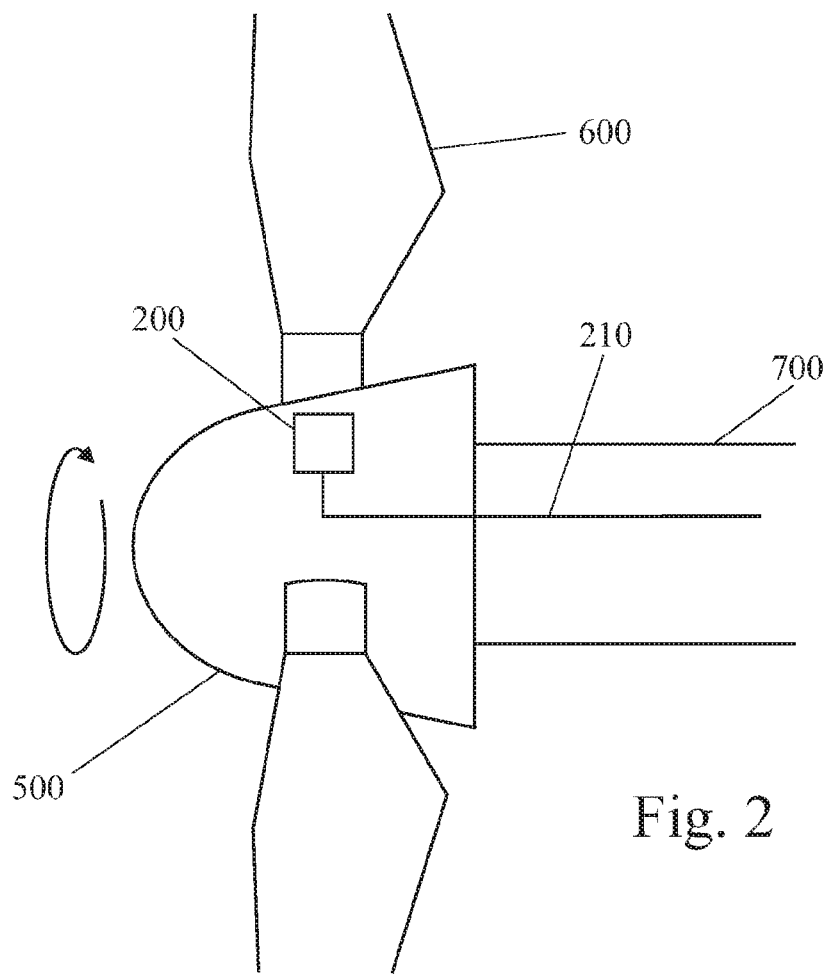
FIG. 2 is a side view of a of a wind turbine rotor hub to which the present invention can be applied.

FIG. 2 is a side view of a of a wind turbine rotor to which the present invention can be applied. The term wind turbine rotor is intended to encompass not only a rotor hub 500 but also other wind-driven rotating parts, especially the rotor blades 600 and the main shaft 700. Accordingly, the present invention may also be applied to installations located inside or at the rotor blades 600 or the main shaft 700. The rotor hub 500 is rotated by wind energy captured by rotor blades 600 attached to the rotor hub. Inside rotor hub 500, a cabinet 200 is installed wherein a number of electric and electronic components (not shown) are located inside cabinet 200. The components inside cabinet 200 are connected to a power source via power supply line 210. During operation, the electric and electronic components inside cabinet 200 produce a considerable amount of heat, thus increasing the temperature inside cabinet 200. To avoid malfunctions of the components due to overheating, cabinet 200 needs to be cooled. It should be understood that cabinet 200 serves as an example for installations to be cooled. Further examples include a pitch drive mechanism to enable adjusting the pitch angle of the rotor blades 600. The pitch drive mechanism includes an electric pitch drive motor, a controller for controlling the motor, a battery as an emergency power supply for the pitch drive and a charger for the battery. The pitch drive mechanism further includes a gear box which is not shown in FIG. 2. Alternatively or in addition, the pitch drive mechanism may also include emergency drives based on spring storages or elastic bands which will also produce heat when being operated.

Figure 3:
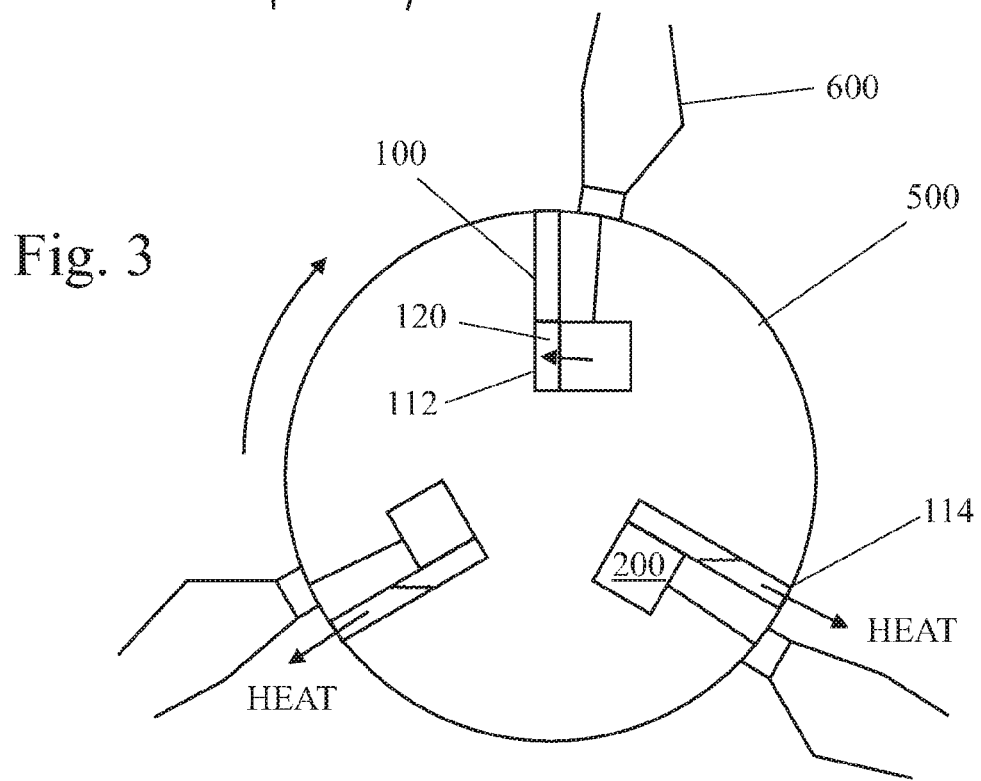
FIG. 3 is a cross sectional view of a of a wind turbine rotor hub in which a cooling device according to an embodiment of the present invention is installed.

The cooling principle of cabinet 200 is shown in FIG. 3 which is a cross sectional view of a of a wind turbine rotor hub in which a respective cooling device 100 is installed next to a cabinet 200 located at a rotor blade 600. Each of the tubes 110 extends from the relatively warmer cabinet 200 to a radially outward region of the hub. This radially outward region may be inside or outside the hub. For example, the cool end 114 of the tubes 110 may extend up to the spinner of the hub which is at environmental air temperature. According to another embodiment, the tubes may even extend through the wall of the hub so that the radially distal ends 114 are exposed to the ambient air. However the cooling works similarly for all embodiments according to the principle explained above with reference to FIG. 1. In particular, the tubes 110 of the cooling devices 100 absorb heat from the cabinet 200 (upright position) and dissipate the absorbed heat in a cooler region, e.g. at the hub casing. The liquid coolant 120 is moved between the cooler and the hotter regions due to the rotation of the hub 500. Thus, heat is transferred from the cabinet 200 toward the hub casing 500 and cabinet 200 is cooled. It should be understood that the cabinet 200 is merely an example for a device to be cooled and the above described cooling device may be used to cool other hub installations like elements of the pitch drive mechanisms or the like.

Figure 4:
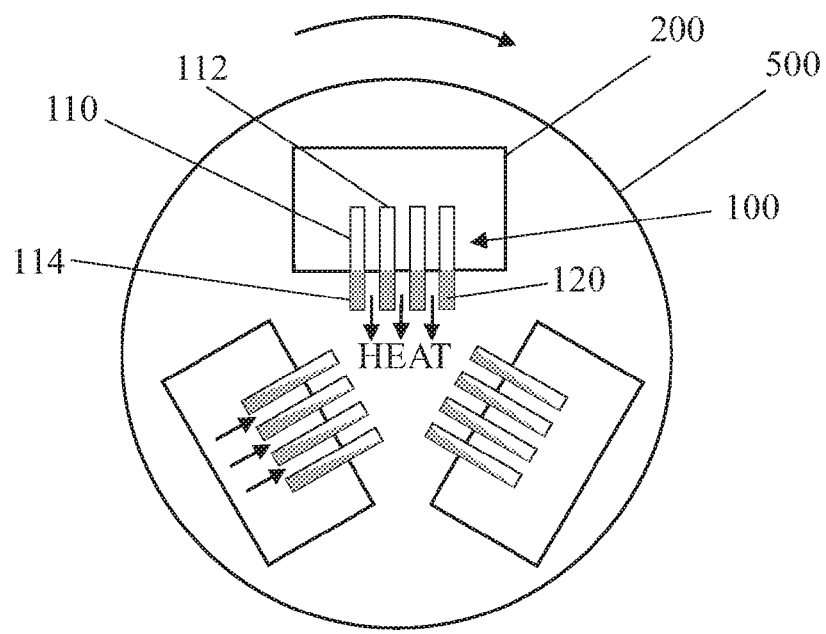
FIG. 4 is a cross sectional view of a of a wind turbine rotor hub in which a cooling device according to a further embodiment of the present invention is installed.

FIG. 4 is a cross sectional view of a of a wind turbine rotor hub in which a cooling device according to a further embodiment of the present invention is installed. Therein, the cooling device 100 includes several tubes which have a fin-like shape to increase heat transfer to and from the tubes 110 and liquid coolant 120 inside the tubes. In the present embodiment, the device 200 to be cooled is a cabinet but can be any closed volume to be cooled. The tubes of the cooling device extend from inside the cabinet 200 to the interior space of hub 500 acting as a cooler reservoir. Furthermore, the tubes of the cooling devices extend roughly in a radial direction of the hub 500. The fundamental working principle is similar to the above-described embodiments. In particular, the liquid coolant 120 absorbs heat when it is inside cabinet 200 and dissipates the heat to the interior space of hub 500 when being at the cooler end 114 of the tube. However, it should be understood that it is not essential to the functioning of the present invention that the tubes are oriented in a radial direction of the wind turbine rotor. In particular, other geometric arrangements may also be applied as will be explained next with reference to FIG. 5.

Figure 5:
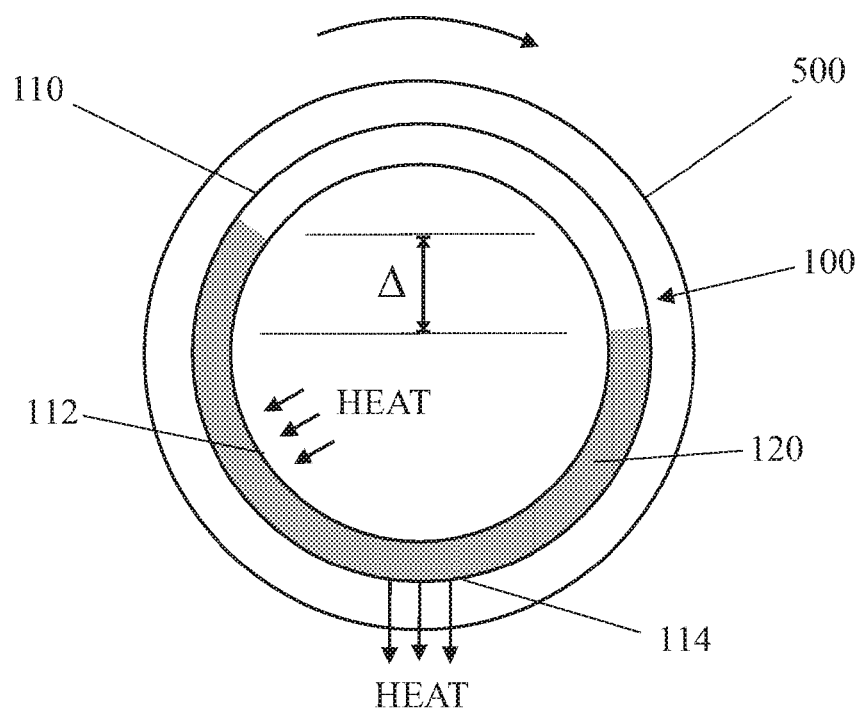
FIG. 5 is a cross sectional view of a of a wind turbine rotor hub in which a cooling device according to another embodiment of the present invention is installed.

FIG. 5 is a cross sectional view of a of a wind turbine rotor hub in which a cooling device according to another embodiment of the present invention is installed. Therein, the cooling device is formed as a closed loop surrounding the interior space of wind turbine rotor hub 500. Closed loop 100 is partially filled with a liquid coolant which gathers in the lower part of closed loop 100 because of gravitational force. However, a liquid level difference Δ will build up between the two ends of the liquid column due to the rotational movement of the hub 500. Viscosity, friction and flow resistance causes the coolant level to rise in the direction of rotation and to be lower at the opposite end. Thus, a permanent pressure is built up by the liquid column of height Δ at one end of the liquid column. In other words, the liquid coolant remains in place while the closed loop 110 of the cooling device 100 moves relative to the coolant. Thus, the coolant 120 absorbs heat in regions 112 where warm parts pass by and dissipates heat in cooler regions 114. In particular, the coolant 120 may even permanently absorb heat from the inside of hub 500 and dissipate heat to structural elements, the hub casing or the outside of hub 500. It should be understood that also in the embodiment shown in FIG. 5, one end or part of tube 110 is located in a relatively warmer region, e.g. the inside of hub 500, whereas an opposite end of tube 110 is located in a relatively cooler region, e.g. at the outer casing of hub 500. Also, the liquid coolant 120 is agitated within tube 110 due to the rotation of the wind rotor. In particular, the liquid coolant 120 moves relative to the tube 110 so that coolant 120 is moved back and forth between warm and cool regions.

Figure 6:
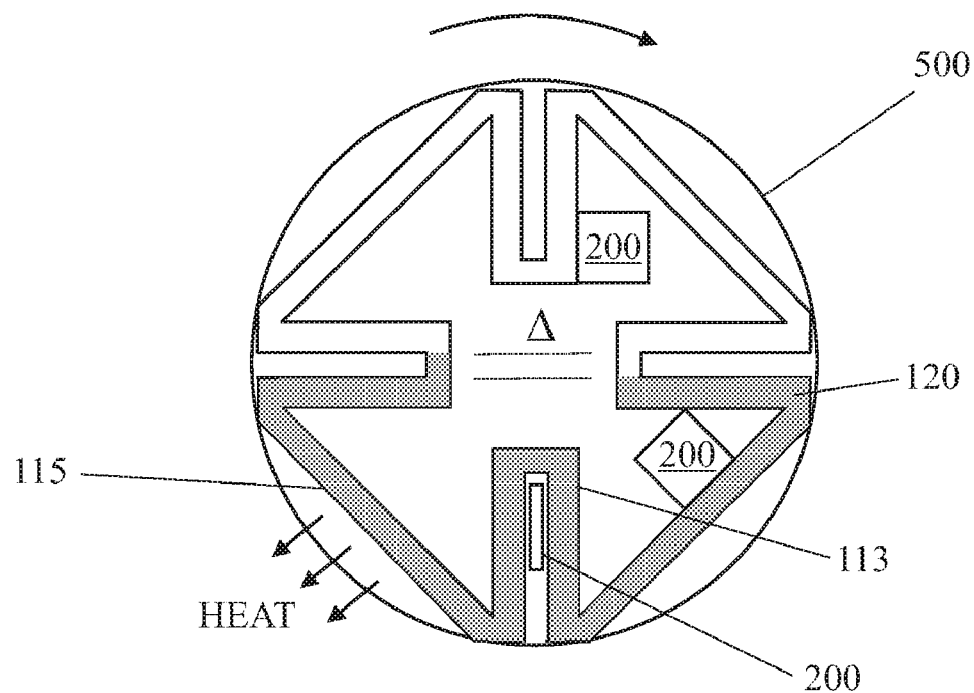
FIG. 6 is a cross sectional view of a of a wind turbine rotor hub in which a cooling device according to a further embodiment of the present invention is installed.

FIG. 6 is a cross sectional view of a of a wind turbine rotor hub in which a cooling device according to another embodiment of the present invention is installed. Therein, the cooling device is formed as a closed loop surrounding the interior space of wind turbine rotor hub 500. Closed loop 100 is partially filled with a liquid coolant which gathers in the lower part of closed loop 100 because of gravitational force. According to the embodiment shown in FIG. 6, the closed loop has radially extending portions 113 connected by circumferentially extending portions 115. Typically, the circumferentially extending portions 115 will be located at a radius near or at the hub casing 500. Therefore, in the present embodiment the heat absorbed by liquid coolant 120 will be mainly dissipated within these circumferentially extending portions 115 while heat absorption will mainly occur at the radially extending portions 113. Of course, other suitable geometries are also contemplated within the scope of the present invention. Furthermore, it should be understood that both the radial and circumferential portions 113, 115 of tube 110 may serve for absorbing and dissipating heat. In particular, the cooling mechanism underlying the embodiment shown in FIG. 6 is similar to the mechanism shown in FIG. 5. Since the cooling device is formed as a closed loop, the liquid coolant will stay at the bottom end of the loop due to gravitational force. However, a slight difference Δ will build up between the two ends of the liquid column due to the rotational movement of the hub 500. Viscosity, friction and flow resistance causes the coolant level to rise in the direction of rotation and to be lower at the opposite end. Thus, a permanent pressure is built up by the liquid column of height Δ at one end of the liquid column. In other words, the liquid coolant remains in place while the closed loop of the cooling device 100 moves relative to the coolant. Several devices 200 are installed adjacent the closed loop and are cooled during rotation of the rotor hub.

It should be understood that the closed loop cooling device can also be employed in the embodiments shown in FIG. 3 or 4. For example, the fin-like tubes of FIG. 3 could be connected to each other to form a closed loop. The tubes may be connected at their upper and/or lower ends, especially in an alternating manner to form a meandering pattern. According to one embodiment, the tubes of each device 200 are interconnected but not connected to the tubes installed of another device. Thus, three independent closed loops are formed. Alternatively, the closed loops of each device 200 may be interconnected so that only a single closed loop is formed.

Figure 7:
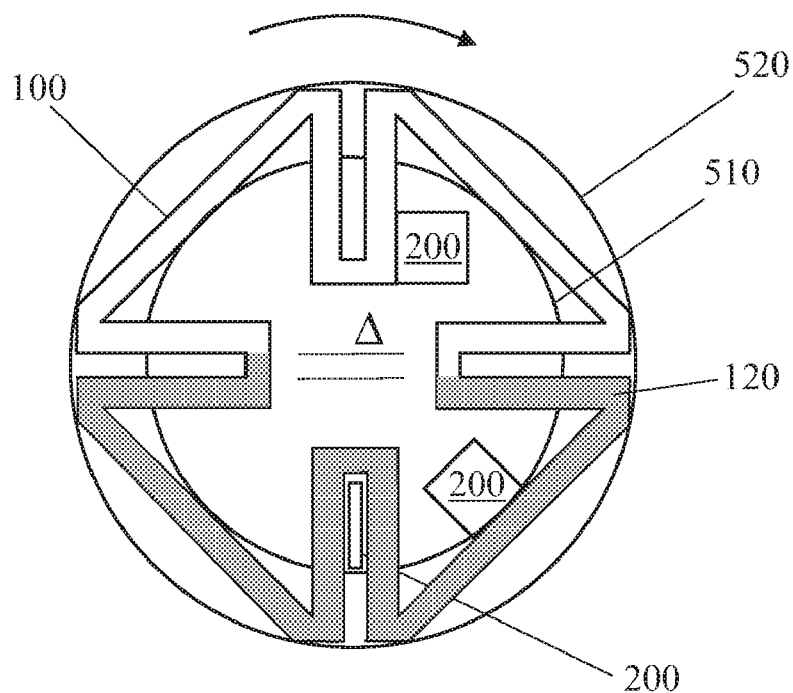
FIG. 7 is a cross sectional view of a of a wind turbine rotor hub in which a cooling device according to still a further embodiment of the present invention is installed.

FIG. 7 is a cross sectional view of a of a wind turbine rotor hub in which a cooling device according to still a further embodiment of the present invention is installed. This embodiment is similar to the one shown in FIGS. 5 and 6, however, the circumferentially extending portions of the cooling device are sandwiched between an inner frame 510 and an outer casing (also called a spinner) of the hub. Inner frame 510 is a structural part of the hub 500 and is typically made of cast steel, welded steel, forged steel, fiber reinforced plastics or aluminum. The outer casing 520 is typically made of a fiber reinforced plastic material but, of course, other suitable materials may also be used, e.g. aluminum. This arrangement of cooling device 100 has the advantage that only the relatively thin hub casing 520 isolates the circumferentially extending portions from the environmental temperatures. Thus, heat dissipation is increased compared to a case in which the cooling device 100 is fully surrounded by inner frame 510.

Figure 8:
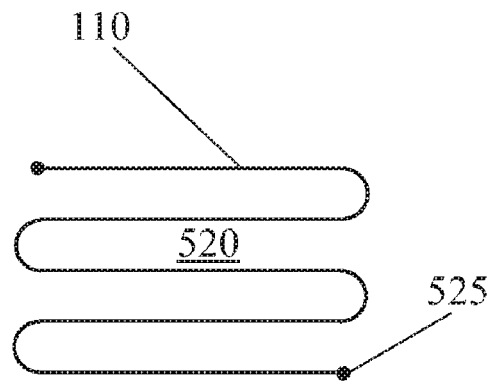
FIG. 8 is a plain view of tubes extending on a surface of a wind turbine rotor hub.

According to an even further embodiment of the present invention, the cooling device 100 may extend from the interior to the exterior of hub 500. FIG. 8 is a plain view of tubes 110 extending on a surface 520 of the wind turbine rotor hub 500. The tubes extend through the hub casing 520 via through-holes 525 provided in the outer casing 520. Typically, the through-holes 525 are sealed so that rain or snow cannot enter the interior of hub 500. On hub surface 520, the tubes 110 extend in a meandering manner to increase the tube surface for heat dissipation.

Figure 9:
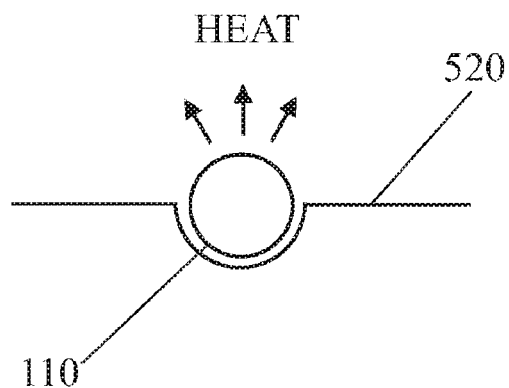
FIG. 9 is a cross sectional view of the tubes shown in FIG. 8.

FIG. 9 is a cross sectional view of the tubes shown in FIG. 8. Therein, it is shown how the liquid coolant will dissipate the absorbed heat to the environmental air. The tube 110 is shown to have a circular cross section but other cross sectional shapes may also be used if suitable. Also, tube 110 is accommodated in a recess of outer casing 520. However, this is merely an optional feature and the recess may be omitted.

Figure 10:
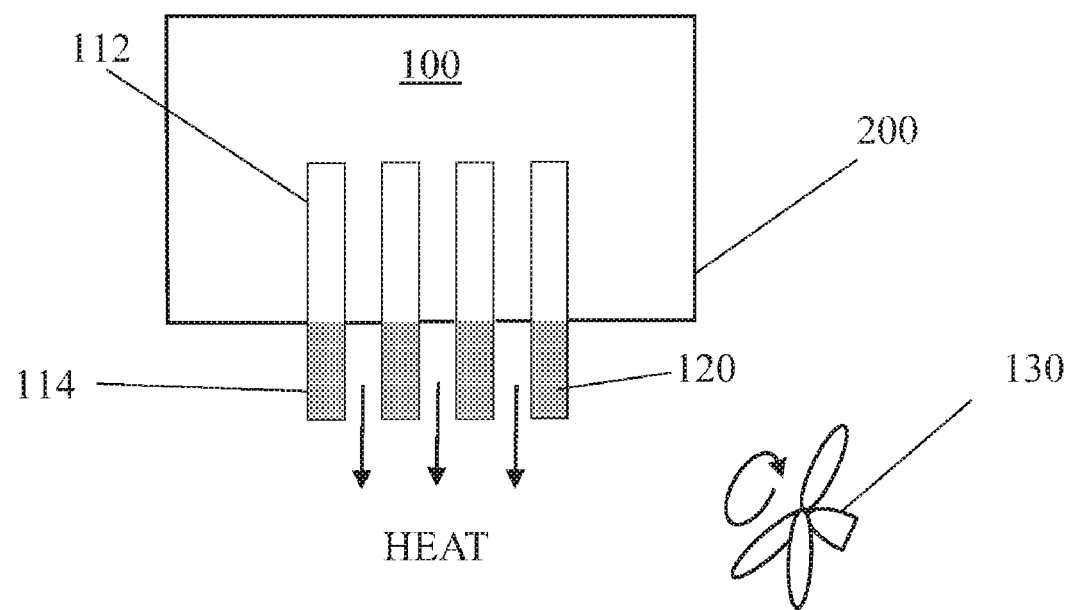
FIG. 10 is a schematic illustration of a fan-assisted cooling device according to an embodiment of the present invention.

FIG. 10 is a schematic illustration of a fan-assisted cooling device according to an embodiment of the present invention. Therein, it is shown that a fan 130 may be provided to accelerate heat dissipation from the liquid coolant into the cooler reservoir 114. Of course, a fan may also be provided inside cabinet 200 to assist the heat transfer to the liquid coolant. Furthermore, it should be understood that fan-assisted heat transfer may be applied also to the other embodiments explained above.

It has been described above that the liquid coolant is agitated by the gravitational and centrifugal forces. However, one or more pumps may be installed to actively pump the liquid coolant. Thus, the movement of the liquid coolant between the warm and cool reservoirs can be assisted. However, care has to be taken since the tubes of the cooling device according to the present invention are only partially filled with liquid. Therefore, specific pumping systems and methods adapted to the case of partially filled tubings have to be applied.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. Furthermore, it is intended that the scope of the present invention also encompasses the use as a heating device. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A cooling device for a wind turbine including a rotating hub, said cooling device comprising:
   at least one liquid-tight tube which is partially filled with a liquid coolant, wherein a first end of the tube is located in a first area of the hub and a second end of the tube is located in a second area of the hub, the first and second areas having different temperatures when operating the wind turbine, the first area defining an inner space of a cabinet in the hub and the second area defining an interior of the hub outside said cabinet.

2. The cooling device of claim 1, wherein the second area is at a hub casing of the hub.

3. The cooling device of claim 1, wherein the liquid coolant has low viscosity.

4. The cooling device of claim 3, wherein the liquid coolant is selected from the group consisting of water, an alcohol, methanol, ethanol, glycol, or any mixture thereof.

5. The cooling device of claim 1, wherein the first end of the at least one tube is installed close to the center of rotation of the hub.

6. The cooling device of claim 1, wherein the at least one tube has a fin-like shape.

7. The cooling device of claim 1, wherein the at least one tube forms a closed loop.

8. The cooling device of claim 7, wherein the closed loop surrounds the interior of the hub.

9. The cooling device of claim 1, further comprising at least one fan for transporting heat to or from the at least one tube.

10. The cooling device of claim 1, wherein the at least one tube is adapted to withstand freezing of the liquid coolant.

11. A heat exchanger for a wind turbine rotor including a rotating hub, said heat exchanger comprising:
   one or more conduits which are partially filled with a liquid and extend from a cool area of the hub to a relatively hotter area of the hub, the liquid being adapted to absorb and dissipate heat,
   wherein the liquid can be agitated within said one or more conduits by rotating the wind turbine rotor, said one or more conduits extending in a circumferential direction of the wind turbine rotor.

12. The heat exchanger of claim 11, wherein said one or more conduits have a radial component with respect to a center of rotation of the wind turbine rotor.

13. The heat exchanger of claim 11, wherein said one or more conduits extend from an inside to an outside of the hub.

14. The heat exchanger of claim 11, wherein said one or more conduits extend between an inner frame and an outer casing of the hub.

15. A method for cooling at least one selected part inside a wind turbine rotor hub, said method comprising:
   (a) providing at least one duct being partially filled with a liquid coolant and extending between the at least one selected part of the hub and a reservoir within the hub having a lower temperature than the at least one selected part; and
   (b) moving the liquid coolant between the at least one selected part and the reservoir having the lower temperature.

16. The method of claim 15, wherein step (b) comprises rotating a wind turbine rotor.

17. The method of claim 15, wherein the liquid coolant is moved back and forth between an inside and an outside of the hub.

18. The method of claim 15, wherein step (b) comprises actively pumping liquid coolant.

\* \* \* \* \*